United States Patent [19]

Mogtader

[11] 3,920,936

[45] Nov. 18, 1975

[54] TOLL-CALL RESTRICTION SYSTEM

[76] Inventor: Charles S. Mogtader, 619 N. Camden Drive, Beverly Hills, Calif. 90210

[22] Filed: Feb. 4, 1974

[21] Appl. No.: 439,308

[52] U.S. Cl. .......... 179/18 DA

[51] Int. Cl.$^2$ .......... H04M 1/66

[58] Field of Search .......... 179/18 DA, 189 D

[56] References Cited

UNITED STATES PATENTS

| | | | |
|---|---|---|---|
| 3,495,050 | 2/1970 | Bart | 179/189 D |
| 3,553,382 | 1/1971 | Knox | 179/18 DA |
| 3,624,317 | 11/1971 | Buckingham et al. | 179/189 D X |
| 3,692,951 | 9/1972 | Hestad | 179/18 DA X |

*Primary Examiner*—William C. Cooper
*Attorney, Agent, or Firm*—Lindenberg, Freilich, Wasserman, Rosen & Fernandez

[57] ABSTRACT

A toll-call restriction system for either a dial phone or a Touch-Tone phone includes a read only memory (ROM) in which different *m*-number combinations are stored, each combination designating a different telephone exchange which is reachable from the controlled phone. The system which is connected to the telephone lines further includes *m* counters, either of the serial or parallel input type. As each of the first *m* digits is dialed by a user of the controlled phone, a number corresponding to the dialed digit is stored in one of the counters. After dialing the first *m* digits an *m*-number combination representing the *m*-dialed digits is stored in the counters. The ROM effectively continuously compares the counters' content, which is the *m*-number combination representing the first *m*-dialed digits, with its stored combinations and provides a first control signal whenever the combination stored in the counters does not match any of the combinations in the ROM. After the dialing of the first *m* digits a timer is activated to provide a second control signal for several seconds. A control unit is used to disconnect the phone from the telephone lines only when both the first and second control signals are produced.

19 Claims, 8 Drawing Figures

TOLL-CALL RESTRICTION SYSTEM

BACKGROUND OF THE INVENTION

1. Field of the Invention

The present invention generally relates to telephone instrumentation and, more particularly, to a system for controlling accessibility to outside telephone exchanges from one or more telephones.

2. Description of the Prior Art

There are situations in which it is desirable to restrict the telephone exchanges accessible on a pair of telephone lines. The primary reason for such restriction in commercial establishments with many phones and employees, is to limit telephone use by employees to authorized exchanges and prevent them, or any unauthorized personnel, from dialing either accidentally or intentionally exchanges from which either multiunit or long distance charges are made. In private homes, it is often also desirable to be able to limit the phone use to specified local exchanges and thereby prevent users in the home for making calls for which additional charges, generally referred to as toll charges, are made against the subscriber without the subscriber's permission, or to prevent accidental dialing of undesired telephone numbers for which toll charges may be incurred.

Herebefore, various devices have been used to prevent unauthorized telephone use. Quite often simple locks are used on dial-type phones. This is undesirable since it prevents all telephone use, including local non-toll calls or emergency calls from being made from the locked-up phone. Also, the appearance of a locked phone in either a private home or a commercial establishment may be be desirable from a public relation point of view.

Some systems have been developed which are capable of limiting the use of a phone to call selected exchanges, while preventing its use to call unauthorized exchanges. However, these systems are very complex, quite large in size and expensive, therefore, excluding their use by private subscribers. A need therefore exists for a simple, relatively inexpensive system capable of limiting a phones accessibility to only subscriber-chosen exchanges. The system should be one which is compatible with load requirements of telephone companies, and one which is easily installable for existing telephones.

OBJECTS AND SUMMARY OF THE INVENTION

It is a primary object of the present invention to provide a new toll call restriction system.

Another object of the invention is to provide a new highly reliable, small and relatively inexpensive toll call restriction system which is easily connectable to existing telephone systems.

A further object of the invention is to provide a reliable and relatively inexpensive system for restricting calls from one or more phones to phones at only selected exchanges.

These and other objects of the invention are achieved by providing an essentially digital toll call restriction system in which a plurality of counters are included. Numbers corresponding to the first few digits, designating the telephone exchange of a desired number, which are dialed by a telephone user are stored in the counters, one number per counter. The numbers corresponding to the exchange-designating digits in the counters are effectively compared with different number combinations, representing exchanges to which the user is permitted to have access which are stored in a read only memory (ROM). If the number combination in the counters does not match any of the number combinations in the ROM, thereby indicating that the exchange sought by the telephone user is not one to which he is permitted to have access, a disabling signal is produced for a selected time period. The disabling signal is used to switch a relay to a state whereby the connection between the phone and the telephone lines is disrupted, thereby preventing the user from reaching the desired number.

On the other hand, if the number combination in the counters matches any of the number combinations in the ROM, no disabling signal is produced. Thus, line disruption or disconnect does not occur and the user is able to complete the number dialing, as if the novel system were not present. As will be pointed out hereinafter, different type ROMs all known to those familiar with the art may be used to provide a disabling signal only when the number combination in the counters is not one which represents an exchange to which the user is to have access.

As used herein, a toll call restriction system is intended to refer to a system in which phone use is limited to selected exchanges, within an area code and/or to exchanges in remote area codes. The system may include means for generating a tone or message to the user to inform him of the unavailability of the exchange dialed by him for his use. The system may further include means for displaying the dialed exchange and for recording the dialed exchanges and for recording the lengths of permissible and completed calls. The system is adaptable for use with either dial-type or Touch-Tone type phones.

The novel features of the invention are set forth with particularity in the appended claims. The invention will best be understood from the following description when read in conjunction with the accompanying drawings.

DESCRIPTION OF THE PREFERRED EMBODIMENTS

Figure 1:
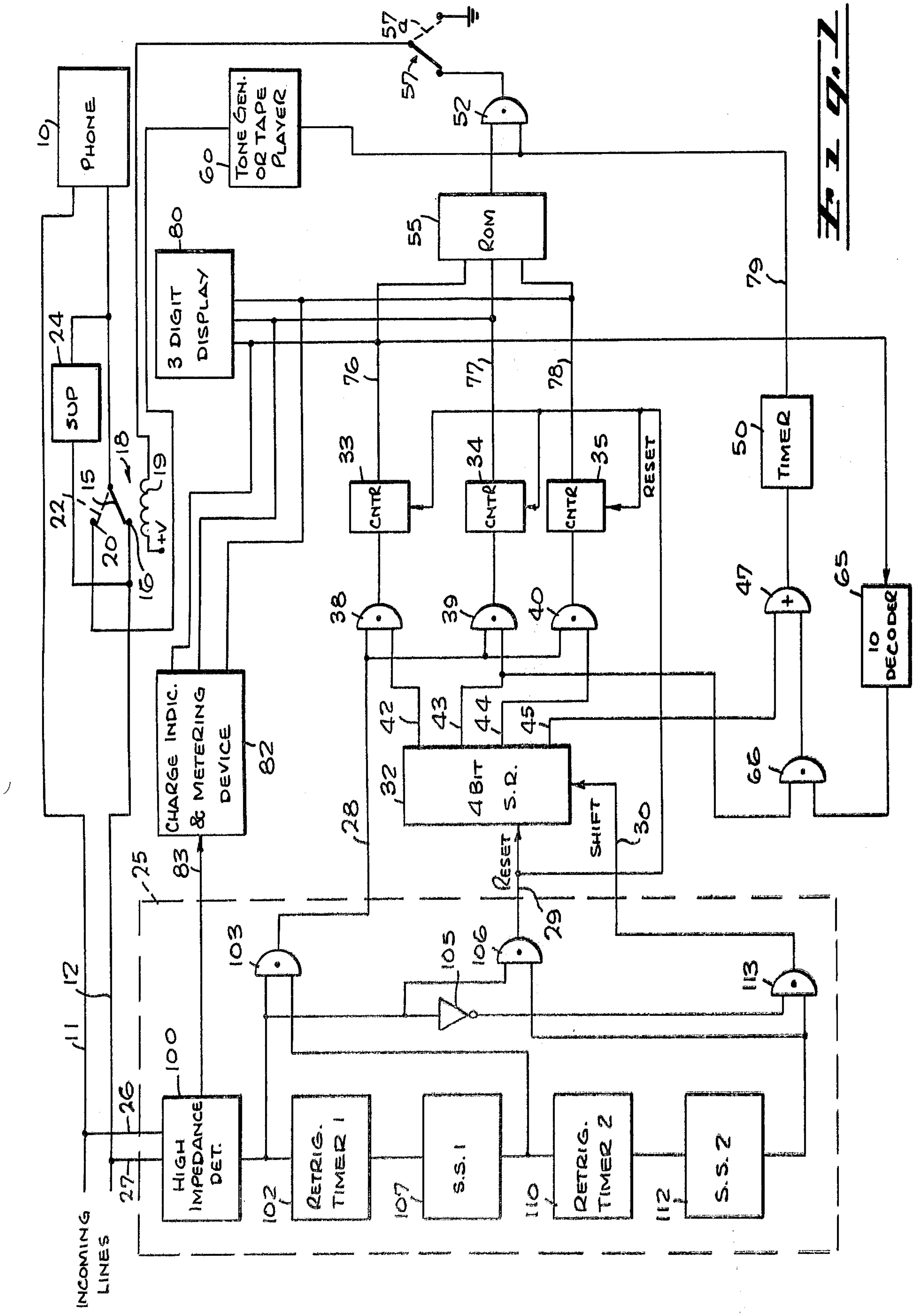
FIG. 1 is a block diagram of one embodiment of a dial-type phone of the present invention.

Attention is first directed to FIG. 1 which is generally a block diagram of one embodiment of the invention directed for use with a dial-type phone 10, and wherein it is assumed that any exchange to be reached is represented by the first three dialed digits. Therein, numerals 11 and 12 designate the telephone lines which are conventionally connected directly to the phone. In the present invention, one of the lines, e.g., line 12 is connected to the phone 10 through a movable contact 15 and a stationary contact 16 of a relay 18 with a coil 19 and another stationary contact 20. As shown the relay is assumed to be energized or simply ON thereby providing electrical continuity between line 12 and the phone 10. When the relay is de-energized, i.e., switched to OFF the contact between contacts 15 and 16 is broken and contact 20 is connected to the phone 10 through movable contact 15 as shown by the dashed line 22. To prevent arcing between contacts 15 and 16, due to contact make or break, an arc suppressor 24 is connected across them.

In the contacts' positions, as shown, the lines 11 and 12 are connected to the phone 10 as if the system of the invention were not present. The system includes an input unit 25 which is connected across the lines 11 and 12 by lines 26 and 27. Unit 25, whose operation will be described hereinafter in detail, has at least three output lines 28–30.

As the receiver of phone 10 is picked up and each of the digits of the desired phone is dialed, unit 25 produces a sequence of pulses on line 28, corresponding to the sequence of pulses produced on lines 11 and 12. The number of pulses in each sequence is equal to the dialed digit except that for the dialed digit 0, 10 pulses are provided. At the end of each dialed digit, and before a subsequent digit is dialed, unit 25 produces a shift pulse on line 30. If, however, before dialing the first three digits, or after the end of the telephone conversation, the receiver is returned to the phone hooks or cradle, or the latter is depressed for redialing, a reset pulse is produced by unit 25 on line 29.

For a telephone system in which an exchange is reachable by the first three digits, the system of the present invention includes a 4-bit (stage) shift register 32, three counters 33–35, and three input And gates 38–40, respectively associated with counters 33–35. Register 32 and the counters are reset by each reset pulse on line 29. When reset, the register's first bit or stage is set to a high state and each of the other three bits to a low state. When the first shift pulse is applied thereto, the high state is shifted to the next bit and the first bit is driven to its low state. Each succeeding shift pulse shifts the high state to a succeeding bit while returning the preceding bit to the low state. At any time, only one bit is at a high state and the other three at the low state. The register has four output lines 42–45, respectively associated with the first through fourth bits of the register. Thus, at any time, only the output line, which is connected to the bit at the high state, is at a high level or simply high, while the other three output lines are at low level or simply low.

Output lines 42–44 are shown respectively connected to gates 38–40 while output line 45 is connected through an Or gate 47, whose function can be ignored for the present description, to a timer 50. The output of the latter is shown connected as one input to an And gate 52. The other input of gate 52 is connected to the output of a read only memory (ROM) 55 which is connected to counters 33–35.

The function of the ROM 55 is to provide a low output to gate 52 whenever the 3 numbers in counters 33–35, representing a 3-number combination, is one which corresponds to the number of an exchange to which the user is to have access. On the other hand, if the 3-number combination in the counters is one which corresponds to the number of an exchange to which the user is not to have access, the ROM output to gate 52 is high.

It should be appreciated that various circuits may be used in implementing the ROM 50. For example, a ROM with magnetic cores may be used. However, to reduce system cost a ROM consisting of a monolithic diode matrix may be employed. In such a ROM, the 3-number combination in the counters represents an address of a location in the memory. The ROM is designed so that only when any one of selected locations therein representing different exchanges to which access is permitted is addressed by the 3-number combination in the counters, a low output is produced. Otherwise, the ROM output is high. For explanatory purposes and to define the scope of the invention, each location which when addressable by the 3-number (or multinumber) combination from the counters produces a low output is assumed to store a 3-number combination designating an accessible exchange. Thus, the ROM required for the present invention is one which produces an output of a first level, e.g., low when a multinumber combination supplied thereto matches any multinumber combination in the ROM. Otherwise, the ROM output is of a second level, e.g., high.

The output of gate 52 is shown connected to a switch 57 which is in turn connected to one end of coil 19, the other end of which is connected to a source of voltage designated +V. With switch 57 in the position as shown, the phone 10 is controlled by the system. As long as gate 52 is not enable, its output is sufficiently low (with respect to +V) thereby producing a sufficient voltage drop across the coil 19 to hold the relay ON, thereby connecting the phone 10 across lines 11 and 12. On the other hand, when the first three dialed digits represent an exchange to which the user of phone 10 is not to have access, the output of gate 52 goes high, as will be described hereinafter, thereby de-energizing relay 18. As a result, the connection between line 12 and the phone 10 is broken. The system may be completely bypassed by switching switch 57 to the position represented by line **57*a*. When in this position, switch 57 connects one end of the coil 19 to ground thereby maintaining the relay ON so that the phone 10 remains connected to line 12 through contacts 15 and 16** regardless of the dialed exchanges.

Briefly, gate 52 provides a high output only when the output of timer 50 is high and the output of ROM 55 is high. The former is high for a fixed time period, e.g., 2 seconds, after being enabled by a high level on line 45. As previously stated, the output of ROM 55 is high as long as the three numbers stored in counters 33–35, representing a three-number combination, does not match any of a plurality of three-number combination in the ROM. These three-number combinations represent exchanges to which the user is permitted to have access. The numbers in counters 33–35 respectively represent the first, second and third digits of the three-digit number. If however, the three numbers in the three counters comprise a combination in the ROM, the latter's output is low and therefore gate 52 remains disabled and its output remains low, regardless of the timer's output level.

It should thus be appreciated that the relay is disabled, thereby disrupting the connection between phone 10 and the incoming lines 11 and 12, only during the time period defined by timer 50 and only if during said timer period the output of ROM 55 is high. Thus, it is the content of ROM 55 which controls which exchanges are accessible by phone 10. If desired, ROM 55 may store combinations representing the non-available exchanges. However, since for practical purposes, the number of non-available exchanges will be greater than those to which access is to be permitted, the latter rather than the former are stored in ROM 55.

The foregoing description will now be described in connection with a specific example. Let it be assumed that a user raises the reciever of phone 10 and starts dialing a phone number whose first three digits are 938. Prior to dialing, the relay 18 is ON, as shown in FIG. 1, and shift register 32 is reset so that its first bit is high and counters 33–35 are all reset so that each stores a 0. Thus, the three number combination from the counters is 000. The ROM does not include such a number and therefore, its output is high. However, the output of gate 52 is low, since timer 50 was not yet activated and therefore its output is low, thereby holding relay 18 ON. As the first digit 9 is dialed, due to the 9 pulses appearing on lines 11 and 12, input unit 25 produces a sequence of 9 pulses on line 28. Since the first bit of register 32 is high, line 42 is high and only gate 38 is enabled. Thus, the 9 pulses pass through gate 38 and are stored in counter 33, which now stores the number 9. After dialing the 9 and before dialing the 3, unit 25 provides a shift pulse on line 30. Thus, the register 32 shifts the high state from the first bit to the second bit. Consequently, only output line 43 is high, enabling gate 39 while gate 38 is disabled when the first bit is shifted back to low. When the digit 3 is dialed 3 pulses are produced on line 28. Since gate 39 is enabled, they are clocked into counter 34. Thus, the latter stores the number 3.

Before dialing the 8, another shift pulse is produced by unit 25 on line 30. Thus, the third bit of register 32 goes high enabling gate 40. Unit 25 now produces a sequence of 8 pulses which are clocked into counter 35 through enabled gate 40. Thus, the counters 38–40 respectively store the numbers 9, 3 and 8 representing the three-number combination 938. The combination in counters 33–35 is continually compared with the three-number combination in the ROM 55.

After the 8 digit is dialed and before the next digit is dialed, another shift pulse is provided by unit 25. Thus, the fourth bit of register 32 goes high. Consequently, output line 45 goes high and through Or gate 47 enables the timer 50. The latter produces a high output for a selected period, e.g., 2 seconds. During these 2 seconds, if the ROM 55 stores a combination 938, its output remains low and therefore even though the timer output is high, gate 52 remains disabled, producing a low output which holds the relay ON, thereby enabling the completion of the call. If, however, ROM 55 does not store the combination 938, its output is high. Therefore, during the 2 seconds that the timer's output is high, gate 52 is turned ON to produce a high output. Consequently, relay 18 is turned OFF, breaking the connection between phone 10 and line 12. Thus, the call cannot be completed.

The contents of the three counters can be thought of as a three-number combination or a three-digit number. In each counter the stored number is the same as a dialed digit, except that for the dialed digit 0, the counter stores the number 10.

The 2 second period during which the line connection is broken is sufficient for the first three dialed digits to be ignored by the telephone equipment. Then, after the 2 seconds, the output of timer 50 is low, thereby disabling gate 52. Thus, the relay is turned ON again, line connection is re-established, and the original dial tone is re-established. When the phone is disconnected, i.e., relay 18 is OFF, the unit 25 produces a reset pulse on line 29 which resets the register 32 and the counters 33–35 to the original state. Thus, if the same number starting with 938 is redialed, the operation merely repeats itself. Although the phone disconnect takes place prior to the end of the 2 seconds and clears the counters, since the cleared or reset counters store the combination 000 which is not present in the ROM, it produces a high output and therefore the disconnect lasts for the full 2 seconds defined by the timer's output.

If desired, the system may include a tone generator or tape player designated by block 60 and hereinafter referred to as unit 60. It is shown activated by the timer outut and its output is connected to contact 20. Thus, when the relay is OFF and the timer output activates unit 60, the latter sends either a selected tone or message to the user to inform him that the call cannot be made on phone 10.

From the foregoing, it should thus be appreciated that the system is capable of preventing any call from being completed from phone 10, based on the first three digits of the call number. With this system, calls are restricted only to those numbers whose first three digits are represented by 3-number combinations in ROM 55. Clearly, the ROM may include any desired set of three-number combinations and may be tailored for the user's particular needs.

The ROM may be made to include all exchanges in the particular area code, in which the phone is located, while excluding all other area codes, as well as exclude certain exchanges within the particular area code while including selected area codes. In this embodiment with 3 counters, once a remote area code is included in the ROM, all exchanges within that area code are accessible.

Although all phones in the United States are presently reachable by direct dialing quite often operator assistance is employed by dialing the digit 0. The system of the present invention may include circuitry to abort all operator calls. Such operator-call abort circuitry is represented in FIG. 1 by a 10-digit decoder 65 and an And gate 66. The former is connected to the output of counter 33 and its output is connectd to one input of gate 66, whose other input is connected to line 43 of register 32. The output of gate 66 is connected to Or gate 47.

In operation, when the first dialed digit is a 0, 10 pulses are produced by unit 25 which are stored in counter 33 as a number 10. The other two counters 34 and 35 store 0's. The ROM does not include the combination 10-0-0. Thus, its output is high. When counter 33 stores a 10, decoder 65 provides a high output ot gate 66. After dialing the first digit register 32 is shifted so that its second bit is high. Thus, line 43 is high and since the output of decoder 65 is high, the gate 66 output is high, activating timer 50 through gate 47. As a result, both inputs to gate 52 are high and consequently, the output of the latter is high, thereby switching the relay to OFF. Thus, all operator calls are aborted, after dialing only the digit 0.

It should be appreciated that the system of the present invention is not required for each phone instrument but rather for each pair of lines, 11 and 12, i.e., for each number to which one or more phones may be connected directly or through a company telephone exchange unit. Thus, phone 10 can be viewed as a group of phones, any one of which is connectable to lines 11 and 12.

Figure 2:
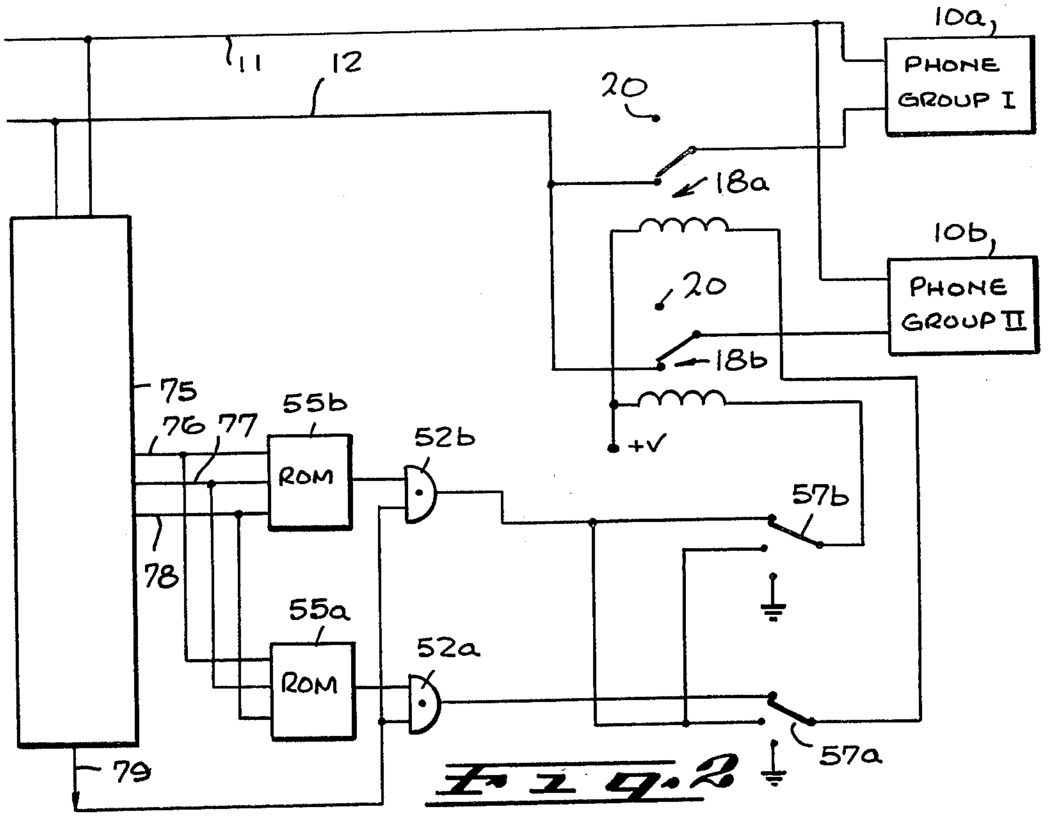
FIGS. 2 and 3 are block diagrams of embodiments for controlling two different phone groups with the present invention.

In large companies with many phones, the present invention may be used to great advantage to limit the phone usage in different company sections or departments to calls which are deemed justified. For example, phones in the production and engineering section, representing one phone group, may be limited to selected local calls, while the phones in the sales department and in the executive offices, regarded as another phone group, may be given broader phone usage, including selected remote area codes. FIG. 2 is a partial block diagram of the system of the present invention designed to provide different telephone coverage for different phone groups. In such an embodiment, each phone group is connected to the incoming lines 11 and 12 through the contacts of a separate relay. In FIG. 2, numeral **10*a* designates a phone group I which is connected to the lines 11 and 12 by a relay 18*a* and numeral 10*b* designates a phone group II connected to the lines by a relay 18*b*. Block 75 designates the input unit 25, register 32, gates 38–40, counters 33–35 and timer 50 and line 79 represents the output of timer 50. Lines 76–78** represent the output lines of the three counters.

In this embodiment the outputs of the counters 33–35 are supplied to two separate ROM's **55*a* and 55*b*. The output of ROM 55*a* is connected to one input of gate 52*a* whose other input is connected to timer 50 via line 79. This line is also connected to one input of a gate 52*b*, whose other input is connected to the output of ROM 55*b*. ROM's 55*a* and 55*b* perform identical functions to that of ROM 55 and gates 52*a* and 52*b* perform identical functions to that of gate 52 perviously described. In the arrangement shown in FIG. 2, two switches 57*a* and 57*b* are shown. Each is a single pole triple throw switch. Either switch can connect the relay coil to which it is connected to the output of gate 52*a*, to gate 52*b*, or to ground. As shown switch 57*a* is positioned so as to connect gate 52*a* to relay 18*a*, while switch 57*b* connects the gate 52 *b* to relay 18*b*.**

In such an embodiment, ROM's **55*a* and 55*b* do not contain identical sets of information. Thus, with switches 57*a* and 57*b* as shown, phone group I is limited to the exchanges defined by the information in ROM 55*a*, while phone group II is limited to the exchanges defined by the information in ROM 55*b*.**

ROM 55 may for example include only non-toll local exchanges while ROM **55*b* may include all local exchanges plus any desired area codes for long distance calling. Thus, with switches 57*a* and 57*b* as shown, phone group I will be limited to only the non-toll local calls and phone group II will have the broader phone coverage, defined by the information in ROM 55*b*. With switches 57*a* and 57*b*** either phone group may be controlled by either ROM, or have full unlimited phone usage when its associated switch connects its relay coil to ground.

Figure 3:
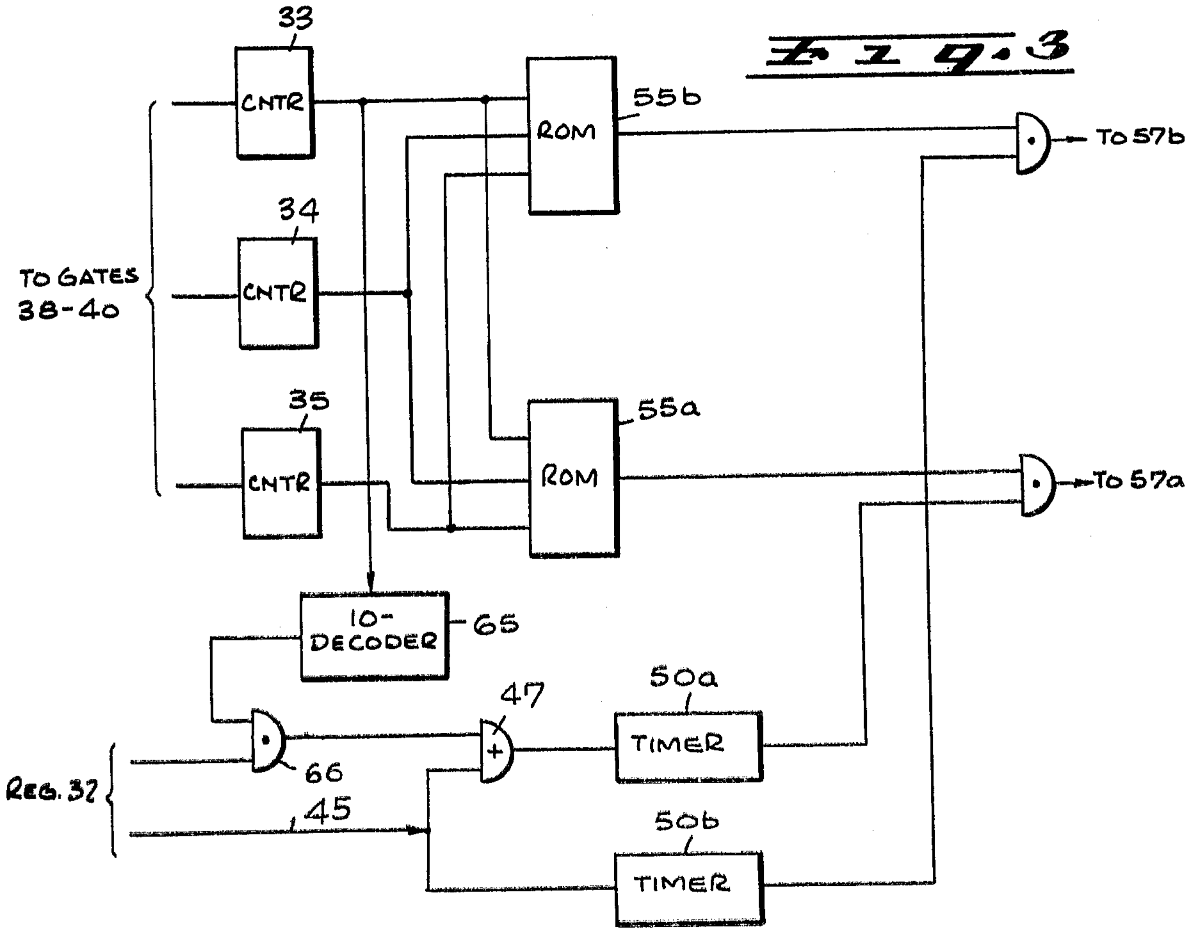

It should be appreciated that the operator-call abort circuitry hereinbefore described may be eliminated in the FIG. 2 embodiment, or it may be used to limit both phone groups. If desired, it may be incorporated only with one of the ROM's. In such an arrangement, two separate timers would be required. FIG. 3 is a partial diagram showing the operatorcall abort circuit associated only with ROM **55*a* and gate 52*a*. The two identical timers are designated by 50*a* and 50*b*,** respectively. Other elements like those previously discussed are designated by like numerals.

If desired, the system may incorporate a threedigit display 80 (see FIG. 1). The display 80 connected to counters 33–35 would display the first three dialed digits to the user for verification, while the rest of the digits are being dialed. This portion of the system may be used without the circuitry used for toll-call restriction.

Since for any phone the first three digits of any number dialed therefore establish the basic charge for a minimum call to the desired number as well as the rate of overtime charges, the first three dialed digits in counters 33–35 may be fed to a charge indicator and metering device 82. The latter upon receiving the three-digit number will display the minimum call charge and the overtime charges.

As is appreciated, during the duration of a telephone conversation from the instant the receiver of the dialed phone is picked up until the call is terminated, the voltage across the lines 11 and 12 is very low (with respect to known voltages). If desired, this voltage may be used in input unit 25 to produce a high level on output line 83 during the entire telephone conversation duration. Line 83 is shown connected to unit 82. Since in the latter, the basic and overtime charges for the particular call are known based on the first three dialed digits, by incorporating therein a clock to determine the length of the conversation and a multiplier, the actual charges for the call may be computed at the end of the call. The charges may be displayed or printed out for customer charging. Since some charges, particularly long distance calls, vary as a function of time of day, a timer may be incorporated in the unit 82 to provide an additional factor in the computation of the call charges. It should again be stressed that just like display 80, unit 82 may be incorporated with or without the call restriction circuitry, consisting of the ROM 55, gate 52, timer 50 and relay 18.

Such an arrangement is believed to be particularly advantageous for hotels, motels or other facilities in which occupants call the facility's operator to place a call for them. The operator typically calls the telephone company operator to place the call and asks for time and charges to be phoned back later for customer charging. With the present invention, the facility operator can place the call directly without requesting telephone operator assistance. No request for time and charges is needed since unit 82 by receiving the first three digits of the dialed number from counters 33–35, the length of the actual conversation, as indicated on line 83, and storing the basic charges for each possible call, computes the actual charges which may either be displayed to the facility operator or preferably permanently printed out for use. The print out may include the time of day, the first three digits of the called number, the length of the conversation and the total charges.

Attention is now directed to FIG. 1 wherein input unit 25 is shown including a high impedance detector 100 which is connected to the lines 11 and 12 via lines 26 and 27. As is known, when the receiver is on the hooks or cradle, a dc voltage of about 50 volts is present across lines 11 and 12. When the receiver is lifted, the voltage drops to about 5 volts. As each digit is dialed, a sequence of pulses appears across the lines, each pulse varying between **50*v* and 5v** for a pulse duration equal to contact opening, which is approximately 50 ms per contact. The number of pulses in each sequence corresponds to the dialed digit, except that the digit 0 is represented by 10 pulses.

Figure 4:
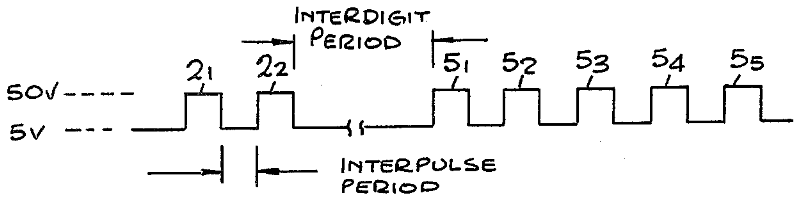
FIG. 4 is a waveform diagram of a pulse sequence produced with a dial-type phone.

Two sequences of pulses for the digits 2 and 5 are shown in FIG. 4. Therein, the pulses for the digit 2 are designated $2_1$ and $2_2$ and those for the digit 5 by $5_1$–$5_5$. In any sequence, the interval between pulses, the end of one pulse, e.g., $2_1$ and the start of the next, e.g., $2_2$, hereinafter referred to as the interpulse period is generally less than 100 ms. In FIG. 4, it is shown as equal to the pulse duration which is about 50 ms. The interval or period between pulses of different digits, i.e., between the end of the last pulse of one sequence such as $2_2$ and the start of the first pulse of the next sequence, such as $5_1$, of course depends on how closely successive digits are dialed. This interval is herein referred to as the interdigit period. It is believed that under the fastest dialing conditions, the interdigit period is greater than 250 ms.

The detector 100 has at least 2 basic functions. It reduces the loading of the lines 11 and 12 to levels permitted by the telephone company. This is achieved by providing a high input impedance at the detector's input of more than one megohm. The second function of the detector is to produce an output compatible for driving the circuitry connected thereto. The output of the detector is actually an amplified output of its input, i.e., a sequence of pulses for each dialed digit.

Figure 5:
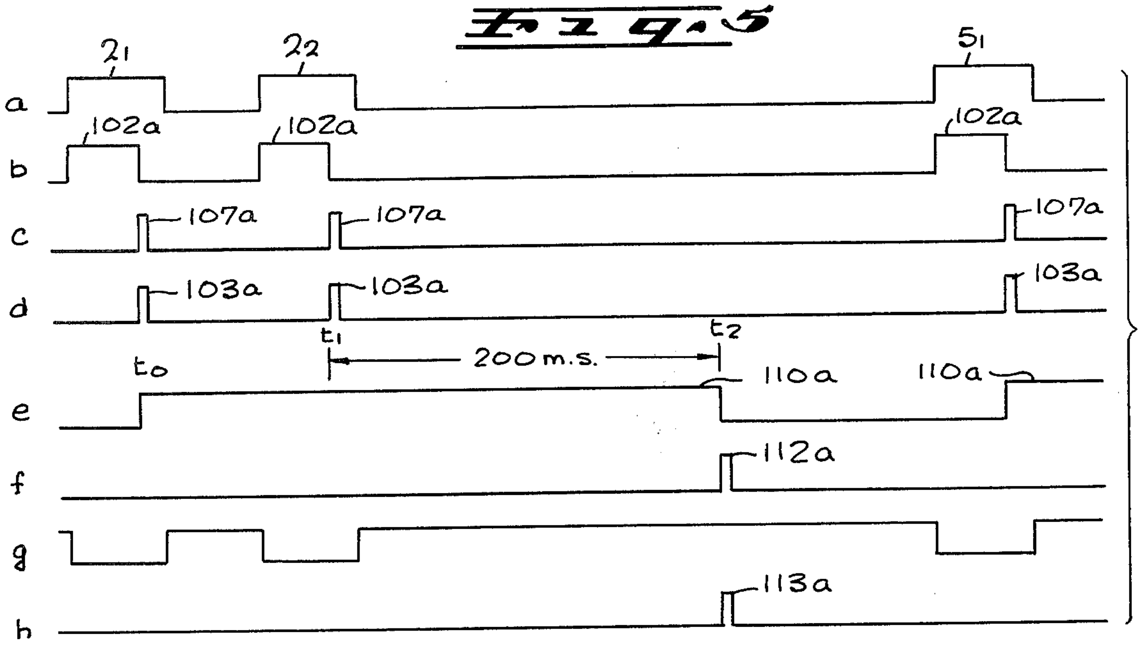
FIG. 5 is a multiline waveform diagram useful in explaining the operation of the input unit shown in FIG. 1.

In FIG. 5, line *a*, the sequence of the two pulses $2_1$ and $2_2$ and the first pulse $5_1$ of the following sequence, as they appear at the detector output, are shown. The detector output is connected to a retriggerable timer 102, to one input of each of And gates 103 and 104, whose outputs are applied to lines 28 and 29, respectively, and to an inverter 105. Timer 102, whose output is shown on line *b*, FIG. 5, responds to the rising edge of each pulse to produce a related high pulse designated by 102*a* for a period somewhat shorter than the pulse period. Thus, assuming each detector output pulse to be 50 ms, each pulse 102*a* from timer 102 is about 40 ms. The trailing end of each timer pulse 102*a* triggers a single or one-shot 107 to provide a short duration pulse 107*a*, which is about 10 microseconds ($\mu$s) long, shown in line *c*, FIG. 5. The output of single shot 107 is supplied to the second input of gate 103. Thus, if the increase in the line voltage to 50*v* is of a duration of more than 40 ms, both inputs to gate 103 are high. Thus, it produces as output pulse 103*a* on line 28 as shown in FIG. 5, line *d*. When the timer pulse 102*a* is 40 ms and that of the single shot pulse 107*a* is 10 $\mu$s, each pulse in line 28 is about 10 $\mu$s long.

The output of single shot 107 is also supplied to a second retriggerable timer 110 whose output (shown in line e FIG. 5) triggers a second single shot 112. The output of the latter, shown in line *f* FIG. 5, is connected to the second input of gate 104, and to one input of an And gate 113, whose other input is connected to the inverter output. Timer 110 is triggered by each pulse 107*a* from single shot 105 to provide a high pulse 110*a* of a duration which is greater than the interpulse interval and less than the expected shortest interdigit interval. Assuming that the shortest interdigit interval is greater than 250 ms, e.g., 300 ms or more, each pulse 110*a* is 250 ms long. If while the output of 110 is high, single shot 107 produces a pulse 107*a* timer 110 is retriggered to provide a high pulse of 250 ms from the last pulse from single shot 107. Thus, as shown in line *e*, FIG. 5, in response to the first 107*a* at $t_0$, timer 110 is triggered. However, when the second pulse 107*a* is received at time $t_1$, timer 110 is retriggered to provide a high pulse until $t_2$where $t_2$—$t_1$ = 250 ms. The falling edge of each pulse 110*a* triggers the one shot 12 to provide a short duration pulse 112*a* of about 10 $\mu$s.

It should be appreciated that in normal operation this pulse 112*a* occurs between dialed digits when the voltage across the lines or the detector output is low. Consequently, the inverter output, shown on line *g*, is high. Thus, gate 113 is enabled (both inputs high) for the duration of pulse 112*a*. It in turn provides a shift pulse 113*a* (see line *h*) on its output line 30.

Whenever the line or detector output voltage goes from low to high, i.e., to 50*v* for a period greater than the total period represented by the pulses of the two timers 102 and 110, i.e., greater than 250 ms single shot 112 produces a pulse 112*a*. Since under such conditions, both inputs to gate 104 are high, it is enabled to provide a reset pulse on line 29. This relationship occurs when a telephone conversation is completed and both receivers are hung up or when the relay 18 is OFF for 2 seconds and the connection between the lines 11 and 12 and the phone 10 is broken. It may also occur, if after dialing several digits of a number, the user intentionally depresses the telephone cradle for redialing purposes. The minimum cradle depression time required by the telephone equipment to disconnect the phone and re-establish the dial tone is longer than the time needed by unit 25 to produce the reset pulse.

From the foregoing, it should thus be appreciated that input unit 25 provides an output pulse on line 28 for each pulse appearing on the lines 11 and 12, provides a shift pulse on output line 30 at the end of one dialed digit and before the start of the next, and resets the circuitry by providing a reset pulse on output line 29 whenever the voltage on lines 11 and 12 rises to 50*v* for more than 250 ms.

Hereinbefore the invention has been described only in connection with embodiments in which line connection is controlled as a function of the first three dialed digits. The invention is not intended to be limited thereto. It is clear that based on the teachings, toll-call or line restriction may be controlled as a function of more than three digits. For example, at present, to dial a long distance call from area code 213, it is first necessary to dial 1 followed by the area code of the desired number. Thus, for use in such an area code, it may be desirable to control line restriction as a function of 4 digits. This is accomplishable by making register 32 a 5 stage register and including a fourth counter and a fourth control gate such as any of gates 38—40, and storing in ROM 55, 4-digit numbers.

In order to be able to discriminate between exchanges in a remote area code, line connection may be based on the first 6 dialed digits (or the first 7 from area code 213). Thus, in such embodiments, register 32 should include 7 (or 8) stages and the system should include 6 (or 7) gates such as gates 38–40 and 6 (or 7) counters. Generally, for a system with *m* counters, ROM 55 defines *m*-number combinations. However, if desired, ROM 55 may include some three number combinations which would only be compared with the three numbers in the first three counters for toll-call restriction within the phone area code and some 6 (or 7) number combinations which would be compared with all the numbers in the counters for discrimination between exchanges in remote area codes. For example, to restrict a phone in area code 213 with an exchange of 477, the ROM may include all three-number combinations of exchanges for which no additional charges are made, but exclude all other exchanges in area code 213. However, to provide access to selected exchanges within remote areas, it may include 7-number combinations. For example, by including the combination 1-312-945 and excluding 1-312-644, the system would enable reaching exchange 945 in area code 312, while preventing reaching exchange 644 in the same remote area code 312.

Figure 6:
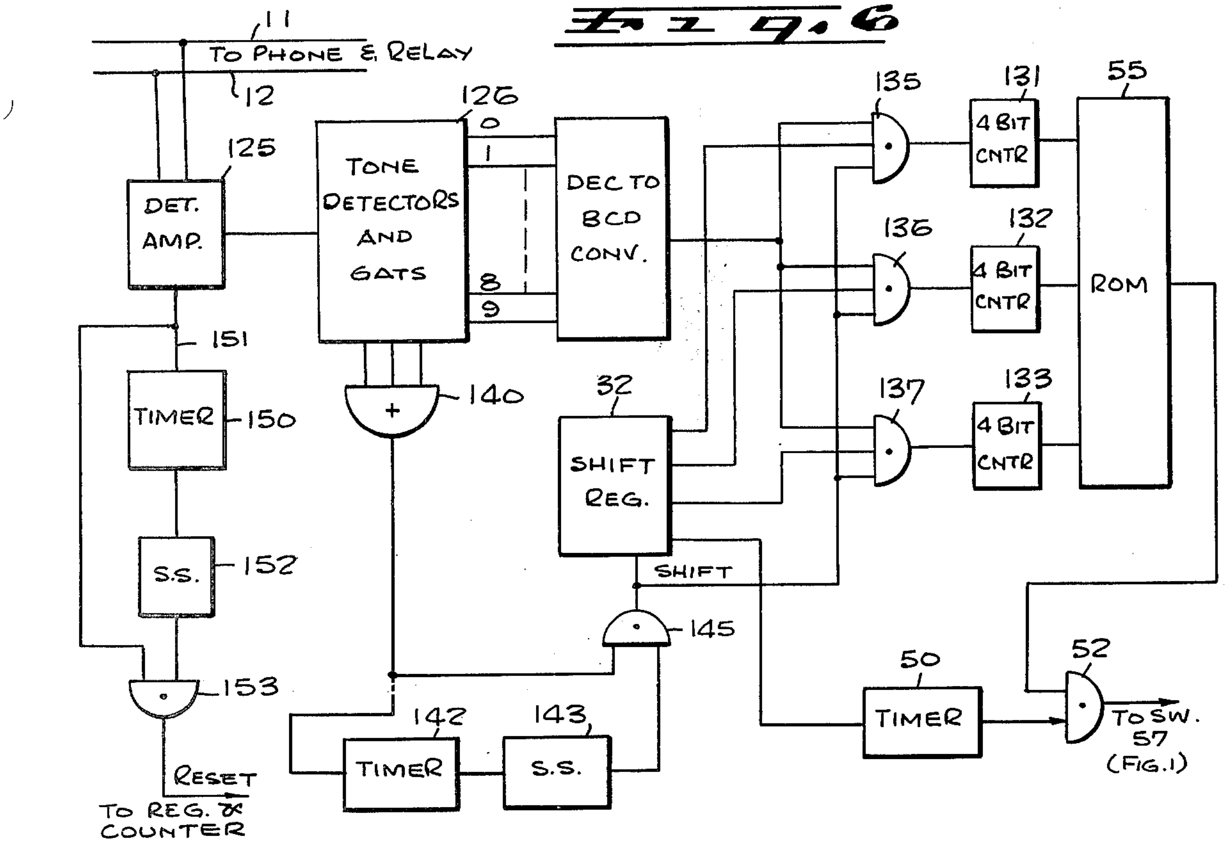
FIG. 6 is a basic embodiment of the invention for controlling a Touch-Tone phone.

Although, hereinbefore the invention was described in connection with dial-type phones, it may be used with touch-tone phones as well. A partial diagram of an embodiment for a touch-tone phone is shown in FIG. 6. Basically, in this embodiment, the detector 100, hereinbefore described is replaced by a detector-amplifier 125. It detects when the imput lines return to 50$v$ which occurs when the receiver is hung up or when the relay 18 (see FIG. 1) is off. It also amplifies the ac frequencies or tones, out of the phone's tone generators for level correction and signal intensity to drive tone detectors included in unit 126, which also includes gates. Basically, for each digit key, depressed by the user, two tones are generated. One of the tones is one of three high frequencies, 1029 Hz, 1336 Hz, and 1477 Hz, hereinafter designated as T1, T2, and T3. The other tone is one of four low frequency tones 697 Hz, 770 Hz, 852 Hz, and 941 Hz. In unit 126, the two tones received from detector 125 for each activated key are decoded and gated to provide a true output on one of 10 output lines designates 0–9. Line 0 is high when the two received tones are decoded and determined to represent a 0. Similarly, each of the other lines is high when the two received tones represent a digit corresponding to the line's designation.

These 10 output lines (0–9) are connected to a decimal to binary-coded-decimal (BCD) converter 130. It decodes the received digit into a four-bit code. The output of the converter 130 is supplied to four four-bit registers 131–133 through gates 135–137. Since the output of the converter is a four-bit code, it has four output lines and four gates are needed to load each register. Thus, each of gates 135–137 should be regarded as representing four gates. However, for explanatory purposes, only one gate per register is shown.

The registers perform identical functions to those of counters 33–35, except that each of registers 133–135 is a four-bit parallel-input register, which is loaded through its four gates which are enabled simultaneously with the 4-bit code from converter 130. The four-bit code in each register which can be regarded as a four-bit counter represents a number or digit. The numbers in the registers are compared with the three number combinations in ROM 55 as hereinbefore described.

It should thus be appreciated that in this embodiment, as the first three digit keys are activated successively, three four-bit codes, representing the digits are successively stored in the three registers, one code per register. For explanatory purposes, the term "dialed digit"is intended to include the dialing of a digit in a dial-type phone or the activation of a digit key in a Tough-Tone phone.

In this embodiment, the tone detectors in unit 126 which decode T1, T2, and T3 are connected to an or gate 140. This gate is enabled when any digit is dialed since any dialed digit produces one of these three tones. Gate 140 when enabled, activates a timer 142 whose output activates a one shot 143. Timer 142 is longer than the time required for the tone decoders in unit 126 to settle and the minimum time for the telephone company circuits to recognize and accept the tones so as to identify the dialed digit. Typically, when a digit is dialed (a key is activated) the tones are produced for more than 100 $\mu$s. Timer 142 is selected to be less than 100 $\mu$s, e.g., 50–80 $\mu$s, at the end of which single shot 143 produces a short pulse of about 5–10 $\mu$s. Its output and that of Or gate 140 are Anded by gate 145 to provide a shift pulse.

In this embodiment, the shift pulse is supplied to all the gates 135–137 to enable the gate (actually four gates) controlled by register 32 to pass the four-bit code to the appropriate four bit register. The shift pulse is also supplied to register 32. It may be desirable to place a short delay unit in the path of the shift pulse to register 32 in order to delay its shifting after the termination of the pulse from gate 145 in order to insure that the register is shifted only when all the gates 135–137 are disabled.

The arrangement shown in FIG. 6 also includes a retriggerable timer 150, activated by the output of detector 125 on line 151. The timer activates a single shot 152 whose output, as well as, line 151 are supplied to an And gate 153. The output of the latter is the reset pulse which is used to reset register 32 and registers 131–133.

In Touch-Tone telephone systems when the incoming lines return to 50$v$ for a minimum period, e.g., 200 ms, the phone is automatically disconnected from the lines. In the present arrangement timer 150 is made somewhat longer than this period so that whenever the phone is disconnected from the lines the reset pulse is provided by gate 152. As previously indicated, the line disconnect occurs when the receiver is replaced on the cradle at the end of a conversation, when the cradle is depressed for redialing or when relay 18 is driven to off.

In a Touch-Tone phone, if 2 keys are depressed simultaneously or one is depressed overlapping the other, the telephone equipment should produce a busy signal which prevents the call from going through. However, the telephone equipment is not foolproof. In the present invention, line disconnect is easily achieved by incorporating the circuitry shown in FIG. 7. The output of three high tone detectors T1–T3 are Anded together by three And gates 161–163 whose outputs are Ored by Or gate 164. The output of the latter is high when two of the three high tones are detected simultaneously. The high output gate 164 activates timer 50 through OR gate 166. Thus, when two high tones are detected simultaneously, timer 50 provides the high output for 2 seconds to one input of gate 52.

The output gate 164 is also supplied to set a flip flop 168 whose Q output is supplied to one input of an Or gate 170. The latter is also supplied with the output of ROM 55. The output of gate 170 is fed to And gate 52. Thus, when two high tones are detected simultaneously FF 168 is set, activating gate 170 to provide a high output, which together with the high output of timer 50 deactivates the relay 18 for 2 seconds to disconnect the touch tone phone from the lines, irrespective of the automatic disconnect which should be provided by the telephone equipment.

Figure 7:
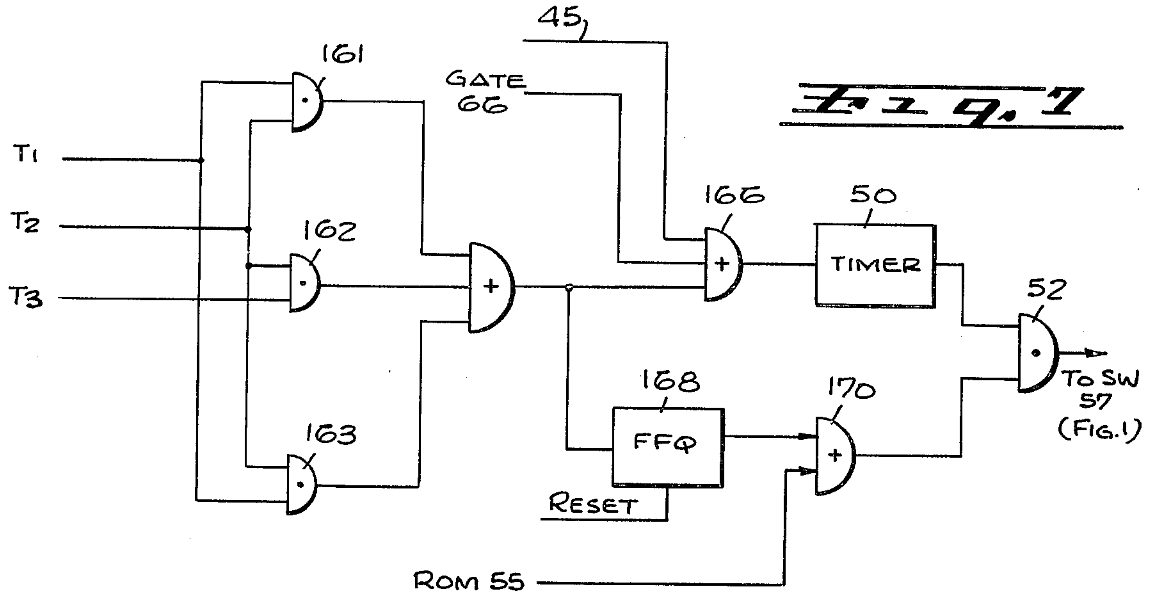
FIG. 7 is a partial diagram of circuitry for use in the invention with a touch-tone phone.

As shown in FIG. 7, gate 166 has one input connected to line 45 from the last stage of register 32 to activate the timer 50 when all the digits are in their appropriate registers, as hereinbefore explained. Gate 166 may also have an input connected to gate 66 (see FIG.

1) if the operator-abort circuitry is to be included therein.

Figure 8:
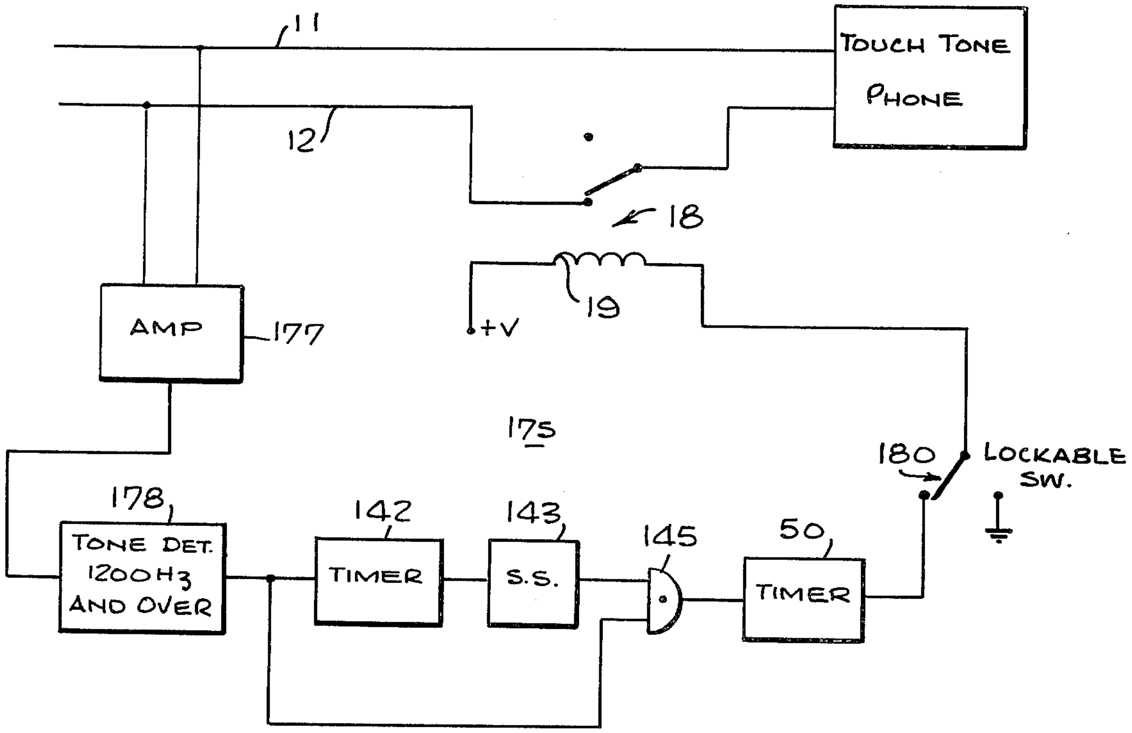
FIG. 8 is a diagram of an electronic-type lock for a Touch-Tone phone.

As previously pointed out dial-type phones can be locked with a mechanical lock. An electronic Touch-Tone phone lock 175 is shown diagrammatically in FIG. 8. Basically, the lock 175 consists of an amplifier 177 which is connected to lines 11 and 12. It amplifies the tones on the lines. Its output is supplied to a tone detector 178 which produces a high output whenever any of the three high tones, all of which are above 1200 Hz,is detected, i.e., whenever a digit is dialed (a key is depressed). Timer 142, single shot 143 and gate 145 perform identical functions as hereinbefore described. Thus, whenever a digit is dialed, an output pulse is produced by gate 145. It activates timer 50 for 2 seconds to produce a high output to relay coil 19 of relay 18 and thereby switch the relay to OFF. Thus, whenever a key is depressed, the phone is disconnected from the lines. If desired, the connection between timer 50 and relay 18 may be through a lockable switch 180. The latter may be locked in the position as shown to utilize lock 175 for phone control. Switch 180 may be of the type in which an appropriate card may be inserted to temporarily connect relay coil 19 to ground rather than to timer 50. In such a case, the card insertion will hold the relay 18 ON and thereby bypass the electronic lock. Thus, the electronic lock will prevent the use of the Touch-Tone phone except by users with the appropriate cards, usable in switch 180. Switch 180 may also be of the mechanical type operable with a key rather than a card.

From the foregoing, it should be appreciated that most of the circuitry in the present invention is of the digital type which is adaptable to large scale integration (LSI) fabrication to reduce both the system's size and cost. The only connections to the telephone lines 11 and 12 are single connections to line 11 and 12 and connecting one of the lines to contacts 15 and 16 of relay 18. In any of the embodiments, the only part which is variable is the ROM 55. The latter can be tailored to the specific user's needs and desires. With present known techniques the cost of specially-tailored ROM's for different users and their specific requirements or desires is quite small. Again, it should be stressed that any ROM capable of providing a low output only when a multi-number combination supplied thereto is one within a selected group of combinations can be used.

Although particular embodiments of the invention have been described and illustrated herein, it is recognized that modifications and variations may readily occur to those skilled in the art and consequently, it is intended that the claims be interpreted to cover such modifications and equivalents.

The embodiments of the invention in which an exclusive property or privilege is claimed are defined as follows:

1. A toll call restriction system for use with telephone lines, comprising:

input means for coupling to said lines for successively sensing signals on said lines corresponding to the first $m$ dialed digits of the number of a telephone to be reached and for producing $m$ digit-representing signals;

first means coupled to said input means and including $m$ counter means arranged in a sequence from one to $m$ for storing numbers in the first through $m^{th}$ counter means, the numbers corresponding to the first through $m^{th}$ dialed digits as represented by said $m$ signals, said stored $m$ numbers in said counter means forming an $m$-number combination;

read only memory means coupled to said $m$ counter means and responsive to the $m$-number combination therein for providing a first control signal only when said $m$ -number combination does not correspond to any one in a plurality of $m$-number combinations defined in said read only memory means, each m-number combination of said plurality of combinations representing the exchange-identifying portion of a telephone number;

a timer coupled to said input means and enabled after said $m$ numbers are stored in said $m$ counter means for providing a second control signal for a preselected first period;

output means for disconnecting the dialed phone from said lines only when both said first and second control signals are supplied thereto; and display means coupled to said m counter means for displaying the numbers stored therein.

2. The system as described in claim 1 wherein the potential across said lines is of a first level when the controlled phone cradle is depressed and is of a second level lower than said first level when the cradle is released, said input means including means for resetting each of said m counter means to an all zero count when the potential across said lines rises from second level to said first level for not less than a required period for the telephone system to re-establish the dial tone condition for said controlled phone, said first period during which said timer provides said second control signal being not less than said required period.

3. The system as described in claim 2 wherein none of the $m$-number combinations defined in said read only memory includes a first number corresponding to the digit zero, and the restriction system includes means for sensing the number stored in said first counter means after the first digit is dialed on said controlled phone, and for activating said timer to supply said second control signal when the number stored in said first counter means corresponds to the digit 0 which is dialed for operator assistance, whereby said output means disconnect said phone from said lines for said first period whenever the first dialed digit is 0.

4. The system as described in claim 2 further including audible signal generating means activated by said second control signal to produce an audible signal and said output means for applying said audible signal to said phone for the time the latter is disconnected from said lines.

5. A lock arrangement for a Touch-Tone telephone connected to telephone lines on which in response to each digit key activated on said phone, signals at two frequencies appear on said lines, one of the frequencies being above a known frequency, the signals being generated for a known minimum period, the arrangement comprising:

detecting means coupled to said lines for providing an enabling output only when signals at a frequency above said known frequency appear on said lines;

means responsive to said enabling output for providing a control signal of a fixed duration only if the enabling output is produced during a preselected portion of said known minimum period; and output means responsive to said control signal for disconnecting said Touch-Tone phone from said lines for the fixed duration of said control signal.

6. A toll-call restriction system for restricting connection of a dial-type phone connected to telephone lines to selected exchanges, comprising:

an input unit connected to said telephone lines on which a sequence of pulses is produced for each digit dialed on said phone, the number of pulses corresponding to the dialed digit, each pulse varying from a first potential level to a second high potential level and of a substantially fixed pulse period, successive pulses within each sequence being spaced apart by a substantially constant interpulse period, said input unit providing on a first output line a pulse for each pulse on said telephone lines and providing on a second output line a shift pulse during a period, definable as an interdigit period which extends between the end of one puse sequence and a succeeding pulse sequence and for providing on a third output line a reset pulse whenever the potential on said telephone lines returns from said first level to said second level for at least a selected period, definable as a phone disconnect period;

a shift register, of n binary stages, $n = m-l$, wherein $m$ and $n$ are integers, $m$ defining the number of the first dialed digits of a selected exchange connected to said input means and responsive to each reset pulse for resetting all of its stages except the first to a low binary state and the first stage to a high binary state, said shift register being further responsive to each shift pulse for resetting a stage thereof which is in a high binary state to the low binary state and for setting a succeeding stage to the high binary state, said shift register including $n$ output lines, each associated with a different stage, each output line being at a high level when its associated stage is at said high binary state and at a low level when its associated stage is at a low binary level;

$m$ separate serial input counters each adapted to respond to a sequence of one or more pulses supplied thereto for storing a digit-representing number therein corresponding to the number of pulses in the sequence, each counter being resettable by each reset pulse from said input means for storing a zero therein, said counters being arranged in a sequence from $l$ to $m$;

gate means coupled to said counters, to the $n$ output lines of said register which are associated with the first $m$ register stages and to said input means, for supplying each sequence of pulses of the first $m$ sequences of pulses provided by said input means in response to the first $m$ dialed digits to a different one of said counters, whereby after the first $m$ digits are dialed the m counters store m numbers corresponding to the first m dialed digits, and the last shift register state is at said high binary state;

a read only memory coupled to said $m$ counters and responsive to the $m$-number combination therein for providing a first control signal only when the $m$-number combination in said counters does not match any combination in a plurality of $m$-number combinations defined in said read-only memory, the $m$-number combinations in said memory representing the numerical designations of selected exchanges;

a timer coupled to the output line associated with the last register stage for providing a second control signal for a fixed period following the switching of the last register stage from said low binary level to said high binary level; and output means for disconnecting said phone from the telephone lines when both said first and second control signals are simultaneously applied thereto.

7. The system as described in claim 6 wherein the interdigit period is not less than 250 ms and said input means include means for providing said shift pulse $x$ ms after the end of a last received pulse in a sequence, where $x$ is not greater than 250 ms and is greater than the interpulse period.

8. The system as described in claim 7 wherein the second control signal duration from said timer is not less that the disconnect period.

9. The system as described in claim 8 wherein said system further includes means for displaying the numbers stored in said m counters.

10. The system as described in claim 6 further including abort means coupled to said first counter and to the second output line of said shift register for sensing the number stored in said first counter and for activating said timer after a digit is stored in said first counter and the register's second stage is shifted to said high binary state only if the number stored in said first counter is a number representing the telephone digit 0, said read only memory being characterized by combinations defined therein none of which includes the number 0 as the first number, whereby when the first dialed digit is 0, thereby indicating telephone operator assistance request, said output means disconnects said dialed phone from the telephone lines for the time of the second control signal from said timer.

11. The system as described in claim 10 wherein the interpulse period is less than $y$ ms, the interdigit period is not less than $z$ ms with said input means including means for providing a shift pulse whenever the line potential is at said first low lever $x$ ms after a last pulse on said lines, where $z > x > y$, and said input means further including means for providing said reset pulse whenever the potential of said lines changes from said first level to said second level for not less than $x$ ms, $x$ ms defining the minimum disconnect period.

12. The system as described in claim 10 further including audio signal generating means for generating an audio signal during the duration of said control signal, and means for connecting said generating means to said output means to apply the audio signal to the dialed phone when the latter is disconnected from said lines.

13. The system as described in claim 6 further including audio signal generating means for generating an audio signal during the duration of said second control signal, and means for connecting said generating means to said output means to apply the audio signal to the dialed phone when the latter is disconnected from said lines.

14. The system as described in claim 10 wherein the potential of said lines drops from said first level to a third lower level during the duration of the connection between said controlled phone and another phone, said level change being provided on a fourth output line of said input means, said system including storing means storing the charges for calls from said controlled phone to phones at exchanges represented by the $m$-number combinations in said memory, and means connected to said input means, said counters and said storing means, for computing the charges of a completed communication as a function of its duration, the $n$-number combination in the counters and the charge in said storing means.

15. The system as described in claim 14 further including audio signal generating means for generating an audio signal during the duration of said control signal, and means for connecting said generating means to said output means to apply the audio signal to the dialed phone when the latter is disconnected from said lines.

16. A toll-call restriction system for restricting the communication between a Touch-Tone phone and any phone reachable through selected exchanges, by controlling the connection of the Touch-Tone phone to the telephone lines as a function of the first m dialed digits, the Touch-Tone phone being of the type whereby as the receiver is raised and the receiver cradle is released, the potential on said lines drops from a first level to a second level, and as each digit is dialed signals at two frequencies, definable as tones, pass through said lines, one of said tones being one of three selected high tones, the system comprising:

first means coupled to said lines for detecting the two tones thereon while each digit is dialed and for providing an output in the form of a coded number identifying the dialed digit as a function of the detected tones;

*m* register means each adapted to store each of the coded numbers from said first means, *m* being an integer and equal to the number of the first dialed digits representing the exchange of the phone whose number is dialed, said *m* registers being arranged in a sequence;

second means responsive to said input means for providing a shift pulse whenever one of the three high tones is detected by said input means for a preselected tone-indicating period;

control means responsive to said shift pulse and including gate means connected between said input means and said *m* registers, for controlling the registers in said register sequence the coded numbers representing the first through $m^{th}$ dialed digits, said control means including means for providing a timer-enabling signal after all the *m* numbers from said input means are stored in said *m* registers;

a read only memory connected to said *m* registers and storing a plurality of *m*-number combinations representing exchanges reachable by said Touch-tone phone for providing a first control signal only when the numbers in said *m* registers, representing an *m*-number combination, matches any of the *m*-number combinations in said read only memory;

a timer connected to said control means and responsive to the timer-enabling signal therefrom, for providing a second control signal for a selected period following each received timer-enabling signal; and output means responsive to said first and second control signals for disconnecting said Touch-Tone phone from said lines during the duration that both said control signals are supplied thereto.

17. The system as described in claim 16 further including means coupled to said *m* register means for displaying *m* numbers corresponding to the coded number in said *m* counter means.

18. The system as described in claim 16 further including audio signal generating means coupled to said timer for providing an audio signal during the second control signal period, and means for connecting said generating means to said output means to apply the generated audio signal to said Touch-Tone phone when the latter is disconnected from said lines.

19. The system as described in claim 16 wherein none of the *m*-number combinations in said memory includes a first number corresponding to the dialed digit 0, which is dialed first for operator assistance, said system further including operator call abort means for sensing the coded number stored in said first register after the first digit is dialed on said Touch-Tone phone and for activating said timer to provide said second control signal when the coded number in said first register corresponds to the dialed digit 0.

* * * * *